W. L. FIELD.
METAL SAWING MACHINE.
APPLICATION FILED SEPT. 2, 1909.
958,614.
Patented May 17, 1910.
2 SHEETS—SHEET 1.
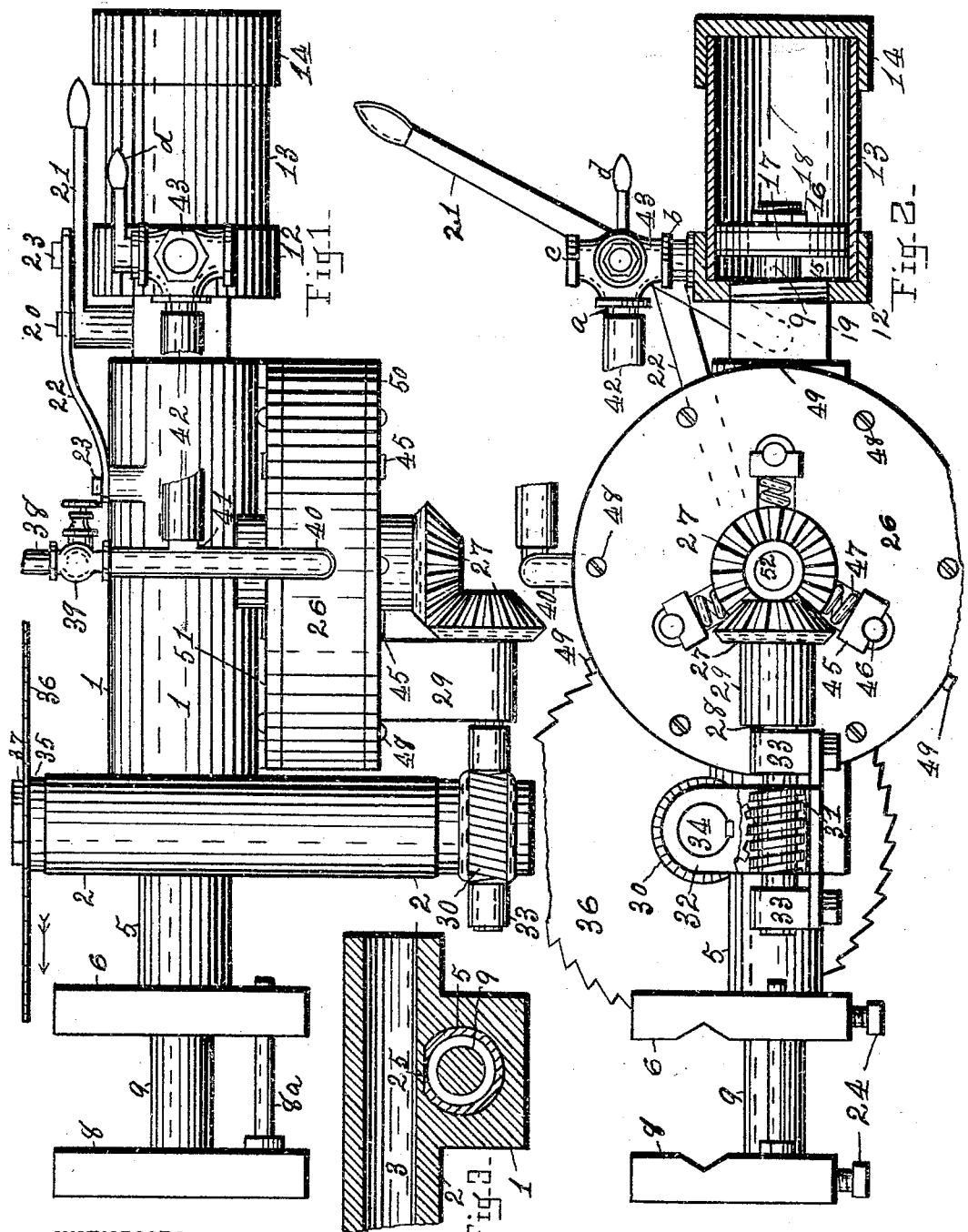
WITNESSES:
INVENTOR.
Wallace L. Field
BY
ATTORNEY.

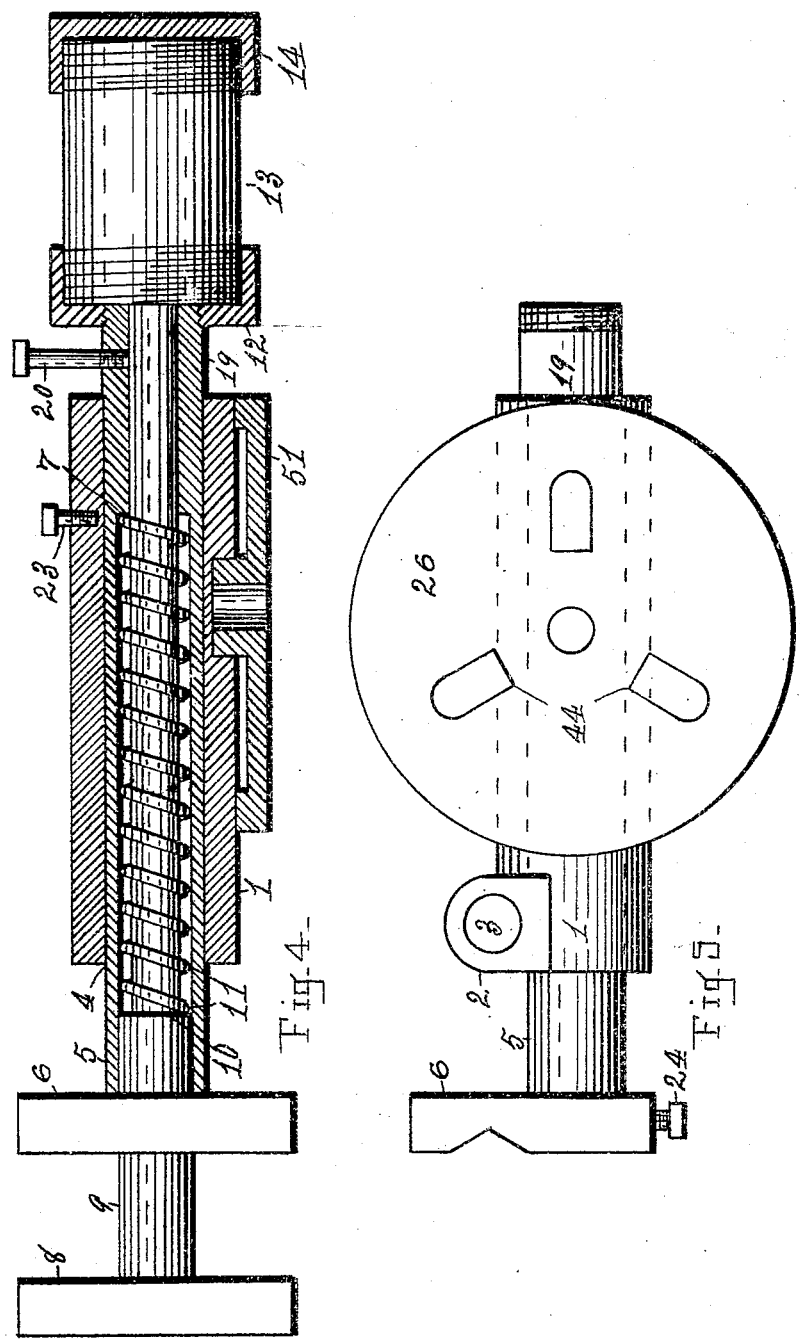

UNITED STATES PATENT OFFICE.

WALLACE L. FIELD, OF WEST DE PERE, WISCONSIN.

METAL-SAWING MACHINE.

958,614.  Specification of Letters Patent.  Patented May 17, 1910.

Application filed September 2, 1909. Serial No. 515,949.

*To all whom it may concern:*

Be it known that I, WALLACE L. FIELD, a citizen of the United States, residing at West De Pere, in the city of De Pere, in the county of Brown and State of Wisconsin, have invented a new and useful Metal-Sawing Machine, of which the following is a specification.

My invention consists of a power driven portable sawing machine for use in sawing stay bolts in the making of steam boilers and similar structures, and it consists of a cast metal base upon which the mechanism is mounted, the mechanism comprising a pair of jaws to be clamped upon the bolt or bar to be sawed, one jaw being movable relative to the other, a spring arranged for normally holding the jaws apart, a compressed air cylinder connected with the stem of the inner jaw and a piston upon the outer jaw stem for clamping the jaws upon the work to be sawed by the action of compressed air upon said piston, an arbor having a saw thereon in position for being moved toward and from the piece to be sawed, mechanism for moving said parts relative to each other, and a motor for causing the revolution of the saw with the necessary gearing for operating the saw at the speed required for successfully performing the work in hand; the motor shown herein being one designed to be operated by compressed air and is of a three cylinder oscillating type, although no claim is made to the invention of the motor in this application, that being reserved for an application which I am about to make for Letters Patent; and an electric, or any other motor adapted for the work in hand may be used with my sawing device for driving the saw, without departing from the principle of this invention.

In the accompanying drawing, Figure 1, represents the invention in a plan view. Fig. 2 represents a side elevation of the same, the compressed air cylinder by means of which the compressed air in it acts to hold the jaws closed upon the piece to be sawed, being in section. Fig. 3 is a vertical section lengthwise of the saw arbor of the end of the base casting in which the arbor is mounted and of that end of the arbor bearing against which the saw collar bears. Fig. 4 is a horizontal section of the base casting and showing the stems of both jaws in position therein, the air cylinder heads in section, and the cylinder secured to said heads, and also showing one end plate of the operating air motor, which plate may be integral with the base piece, or be bolted to it, as desired. Fig. 5 is a side elevation of the base casting, with the inner one of the two jaws in position, and also, one end plate of the motor casing.

Similar numerals and letters indicate like parts in the several views.

1, indicates the base, or supporting casting for the mechanism; 2, arms which are elevated from the base and extend in opposite directions from the base for carrying the saw arbor in the bearing 3. Longitudinally of the base it has a bore 4, for receiving the tubular stem 5, of the jaw 6. The stem 5, is counterbored from the end to which the jaw is attached to the point 7, and providing a shoulder at 7, against which one end of the spiral spring 11 abuts. The jaw 8, is provided with a stem 9, which is fitted to the counterbore of the stem 5, the stem being turned down from the shoulder 10, for fitting the small bore of the stem 5, and providing an abutment between said shoulder and the shoulder 7, for the spiral spring to press against and normally separate the jaws. The stem 5 of the jaw 6, passes through the base 1, and has secured to its right hand end, one head, 12, of the compressed air cylinder 13, another head, 14, being secured to the other end of the cylinder. These cylinder heads may be secured to the stem 5 and to the cylinder 13, by means of threads or otherwise. The stem 9, extends through the smaller bore in 5 and the cylinder head 12, and has secured thereon a piston, said piston having the usual head 15, follower 16 and rings 17, secured in position on the stem by means of the nut 18. The collar 19, of the stem 5, is provided with a bolt 20, upon which a lever handle 21, is fulcrumed, and a link 22, connects the lever with the base piece 1, upon the bolt 23. The jaws are secured to their respective stems in any suitable manner, as by means of set screws 24. For holding the tubular stem 5, from turning around in its bore, one side of it is flattened as is shown at 25, the bore being babbitted around the stem. The stem 9 of the other jaw may be splined into the collar 19, in a well known manner, or the jaw 8 may be provided with the fixed rod $8^a$, which is arranged to slide through a bore in the jaw 6, for holding the jaw parallel with the jaw 8. The article to be sawed is to be clamped between the two angular openings in the jaws and by means of the action of the compressed air in the cylinder, is held firmly in position while being cut. By throwing the lever 21, forward, the arms 2, carrying the saw arbor, can be fed to the work to such a degree as the power that drives the saw, will admit. In this case, the motor 26, is provided with a pair of beveled gear wheels 27, one on the motor shaft and the other on the shaft 28, which is supported in the bearing 29, that extends out from the motor end plate, and with a worm wheel 30, and worm shaft 31, supported in bearings 32 and 33, respectively, the worm wheel being keyed to the saw arbor 34. The arbor extends through the bearing 3 and is provided with a collar 35, saw 36, and nut 37.

The motor is supplied with compressed air through the hose 38, from a source of supply, and through the valve 39, a pipe 40, delivering the air to the motor. A T, 41, having a hose 42, connects the supply pipe 40, with a three way valve 43, upon the cylinder head 12. This valve is supplied with three openings, $a$, $b$, and $c$, the opening $a$, receiving the compressed air from the hose 42, and delivering it through the opening $b$, to the cylinder, when the piston being driven toward the other end of the cylinder, the jaw 8, will be held firmly against the piece between the jaws until the operator by turning the valve handle $d$, closes the opening $a$, and opens a passage, or the exhaust, from the cylinder through the openings $b$ and $c$, when the pressure within the cylinder being relieved, the jaws separate and the tool can be removed to other work. 44 indicates the gudgeon supporting journal box openings in the end plates of the motor case, 45 the journal boxes, 46 the gudgeons, 47 springs under the journal boxes, 48, fastening bolts through the end plates of the motor into the body of the case, and 49, exhaust pipes from the motor cylinders, 50, one end plate of the motor case, 51, the other end plate, and 52, its crank shaft, the motor represented being of a three cylinder oscillating type.

Having described my invention, what I claim and desire to secure by Letters Patent, is,—

1. A metal sawing machine, comprising a suitable base, or support for the mechanism, two jaw stems, one of them being tubular, having each a jaw secured upon one end thereof and adapted to receive and hold between them the piece to be sawed, each stem being arranged to be reciprocated longitudinally thereof, relative to said base and independently of each other, a spring arranged between the two stems which normally separates the jaws means for preventing the two jaw stems from turning around relative to the base piece, the stem of the inner jaw having secured to its opposite end from the jaw a compressed air cylinder, the stem of the outer jaw passing through the tubular jaw stem and into said cylinder, a piston secured to the latter stem inside of said cylinder, a connection from said cylinder through a three way valve with a compressed air supply source, whereby air can be admitted for action upon said piston for clamping the jaws aforesaid upon the piece to be sawed.

2. A metal sawing machine, comprising a suitable base, or support for the mechanism, two jaw stems, one of them being tubular, having each a jaw secured upon one end thereof and adapted to receive and hold between them the piece to be sawed, each stem being arranged to be reciprocated longitudinally thereof relative to said base, and independently of each other, a spring arranged between the two stems which normally separates the jaws, means for preventing the turning around of the two jaw stems relative to the base piece, the stem of the inner jaw having secured to its opposite end from the jaw a compressed air cylinder, the stem of the outer jaw passing through the tubular outer jaw stem and into said cylinder, a piston secured to the latter stem inside of said cylinder, a connection from said cylinder through a three way valve with a compressed air source of supply, a saw arbor arranged on said base at right angles with and above said jaw stems, a saw secured upon one end of said arbor, a motor for revolving the saw connected with said base, suitable gearing connecting the motor and saw arbor, a connection from the motor with a source of power supply, and a hand operated lever and connections therefor arranged for moving the jaws and saw toward and from each other.

3. A metal sawing machine, consisting of a suitable base, or support for the mechanism, the jaws 6 and 8 having stems 5 and 9, respectively, to one end of each of which stems a jaw is secured, the spring 11, arranged between the stems for spreading the jaws apart, a compressed air cylinder secured to the opposite end of the stem 9, a piston secured to the opposite end of the stem 5, and reciprocable within said cylinder, a three way valve attached to said cylinder, a connection from said cylinder with a compressed air source of supply through said three way valve, the saw arbor 34, the saw 36, secured thereto, means for holding the jaws in parallel relation relative to the saw, a motor for revolving the saw, a shaft for transmitting power from the motor to the saw suitable connections from the motor to a source of power supply, a worm wheel secured upon one end of the saw arbor, a worm shaft engaging said worm wheel, suitable gearing connecting the worm shaft and motor shaft, the lever 21, fulcrumed upon the stem 9, and the link 22, connecting the lever and base piece, for feeding the saw and piece to be sawed toward and from each other, said parts being arranged and operating substantially as shown, the piston and cylinder for clamping the jaws to the piece to be sawed, and the motor for revolving the saw.

WALLACE L. FIELD.

Witnesses:
M. J. MAES,
JENETT FIELD.